(12) United States Patent
Walker et al.

(10) Patent No.: US 11,218,762 B2
(45) Date of Patent: *Jan. 4, 2022

(54) CONTENT ARCHIVE MODEL

(71) Applicant: Comcast Cable Communications, LLC, Philadelphia, PA (US)

(72) Inventors: Todd Walker, Delran, NJ (US); Bruce Bradley, Wayne, PA (US); Thomas Day, West Chester, PA (US); Robert Gaydos, West Chester, PA (US); John Leddy, Bryn Mawr, PA (US); Weidong Mao, West Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,106

(22) Filed: Feb. 25, 2015

(65) Prior Publication Data
US 2015/0242500 A1    Aug. 27, 2015

Related U.S. Application Data

(63) Continuation of application No. 13/024,870, filed on Feb. 10, 2011, now Pat. No. 9,003,462.

(51) Int. Cl.
*H04N 21/274* (2011.01)
*G06F 16/70* (2019.01)
(Continued)

(52) U.S. Cl.
CPC ......... *H04N 21/274* (2013.01); *G06F 3/0641* (2013.01); *G06F 11/1448* (2013.01);
(Continued)

(58) Field of Classification Search
CPC ............... H04N 21/218; H04N 21/231; H04N 21/23418; H04N 21/24; H04N 21/274;
(Continued)

(56) References Cited

U.S. PATENT DOCUMENTS

| 2004/0019900 A1* | 1/2004 | Knightbridge ..... G06Q 30/0277 |
| | | 725/23 |
| 2004/0154040 A1* | 8/2004 | Ellis ................... H04N 21/4438 |
| | | 725/58 |

(Continued)

FOREIGN PATENT DOCUMENTS

| WO | 2004/102421 A1 | 11/2004 |
| WO | 2010/118254 A1 | 10/2010 |

OTHER PUBLICATIONS

Chuanyi Liu, Yingping Lu, Chunhui Shi, Guanlin Lu, David H.C. Du, and Dong-Sheng Wang, "ADMAD: Application-Driven Metadata Aware De-duplication Archival Storage System," SNAPI 2008, 5th IEEE International Workshop on Storage Network Architecture and Parallel I/Os. XP031365444.

(Continued)

*Primary Examiner* — Jeremy S Duffield
(74) *Attorney, Agent, or Firm* — Banner & Witcoff, Ltd.

(57) ABSTRACT

An archive model can be used for managing networked storage of recorded content, such as network DVR (digital video recorder) content. Content may be initially recorded to an active storage device, with individual duplicate copies recorded for each requesting user, and subsequently archived to an archive storage device. For playback, the content can be reconstituted into the active storage device prior to delivery to the requesting user. Content can be predictively reconstituted in anticipation of user needs, and the reconstitution capacity of the system can be dynamically reallocated for load balancing.

40 Claims, 7 Drawing Sheets

(51) Int. Cl.

| | |
|---|---|
| *H04N 21/231* | (2011.01) |
| *H04N 21/2743* | (2011.01) |
| *H04N 21/234* | (2011.01) |
| *H04N 21/218* | (2011.01) |
| *H04N 21/437* | (2011.01) |
| *H04N 21/24* | (2011.01) |
| *H04N 21/2747* | (2011.01) |
| *G06F 11/14* | (2006.01) |
| *H04N 5/76* | (2006.01) |
| *H04N 21/442* | (2011.01) |
| *G06F 3/06* | (2006.01) |
| *G06F 16/174* | (2019.01) |
| *H04N 7/173* | (2011.01) |
| *H04N 21/258* | (2011.01) |
| *H04N 21/239* | (2011.01) |

(52) U.S. Cl.
CPC ...... *G06F 11/1451* (2013.01); *G06F 11/1453* (2013.01); *G06F 16/1748* (2019.01); *G06F 16/70* (2019.01); *H04N 5/76* (2013.01); *H04N 7/17336* (2013.01); *H04N 21/218* (2013.01); *H04N 21/231* (2013.01); *H04N 21/2393* (2013.01); *H04N 21/23103* (2013.01); *H04N 21/23418* (2013.01); *H04N 21/24* (2013.01); *H04N 21/25891* (2013.01); *H04N 21/2743* (2013.01); *H04N 21/2747* (2013.01); *H04N 21/437* (2013.01); *H04N 21/4424* (2013.01); *H04N 21/44204* (2013.01)

(58) Field of Classification Search
CPC .......... H04N 21/2743; H04N 21/2747; H04N 21/437; H04N 21/44204; H04N 21/4424; H04N 5/76; H04N 21/23103; H04N 21/25891; H04N 21/2393; H04N 7/17336; G06F 11/1448; G06F 11/1451; G06F 11/1453; G06F 16/1748; G06F 3/0641; G06F 16/40; G06F 16/70; G06F 17/30017; G06F 17/30781; G06F 17/30817
USPC ........................ 725/9–21, 114–117
See application file for complete search history.

(56) References Cited

U.S. PATENT DOCUMENTS

| | | | | |
|---|---|---|---|---|
| 2005/0213439 | A1* | 9/2005 | Johnson | H04N 21/4104 369/30.18 |
| 2006/0110136 | A1* | 5/2006 | Abecassis | H04N 21/234318 386/261 |
| 2006/0159109 | A1 | 7/2006 | Lamkin et al. | |
| 2006/0161635 | A1 | 7/2006 | Lamkin et al. | |
| 2006/0271948 | A1* | 11/2006 | Oz | H04N 21/23608 725/25 |
| 2007/0157247 | A1 | 7/2007 | Cordray et al. | |
| 2007/0250901 | A1* | 10/2007 | McIntire | H04N 21/8586 725/146 |
| 2007/0282925 | A1* | 12/2007 | Son | H04N 21/2743 |
| 2008/0092168 | A1 | 4/2008 | Logan et al. | |
| 2008/0092181 | A1* | 4/2008 | Britt | H04N 21/47202 725/87 |
| 2009/0025054 | A1* | 1/2009 | Gibbs | H04N 21/4331 725/127 |
| 2009/0037964 | A1 | 2/2009 | Murray et al. | |
| 2009/0100478 | A1* | 4/2009 | Craner | H04N 21/47214 725/87 |
| 2009/0112899 | A1 | 4/2009 | Johnson | |
| 2009/0193457 | A1* | 7/2009 | Conn | H04N 21/6125 725/34 |
| 2009/0317065 | A1 | 12/2009 | Fyock et al. | |
| 2010/0021138 | A1* | 1/2010 | Perrault | G11B 27/11 386/241 |
| 2010/0111504 | A1* | 5/2010 | Yu | H04N 21/2541 725/38 |
| 2010/0205644 | A1 | 8/2010 | Lin et al. | |
| 2010/0263008 | A1* | 10/2010 | Meuninck | G06T 1/0021 725/110 |
| 2010/0319044 | A1 | 12/2010 | Agans et al. | |
| 2012/0072729 | A1* | 3/2012 | Winograd | H04L 63/0823 713/176 |
| 2012/0072958 | A1* | 3/2012 | Smyth | H04N 21/23424 725/93 |
| 2012/0079184 | A1* | 3/2012 | Jaquette | H04N 21/2182 711/111 |
| 2012/0301104 | A1* | 11/2012 | Dove | H04N 21/4122 386/239 |

OTHER PUBLICATIONS

Mar. 27, 2014 Office Action issued in European Patent Application No. 12 154 178.3.

Anonymous, "Thema:Onlineradiorecorder", Apr. 13, 2010, pp. 1-3, XP55025015, Retrieved from the Internet: URL http://www.otrforum.com/showtread.php?59957-Onlineradiorecorder, Posts by "Luigi" and "Krisovice", p. 1.

Juliane Harm: "Zulassigkeit des Betriebs Virtueller Videorecorder", May 17, 2006, pp. 1-25, XP55024833, Rostock, retrieved from the Internet: URL:http://www.gersdorf.uni-rostock.de/fileadmin/Jura_KR/Harm.pdf.

Extended European Search Report, EP12154178.3, dated May 18, 2012.

Anonymous: "Data deduplication—Wikipedia, the free encyclopedia", Feb. 8, 2011, pp. 1-6, XP055253542, retrieved from the Internet: URL: https://en.wikipedia.org/w/index.php?title=Data_deduplication&oldid=412731140.

"Algorithmen zur Ähnlichkeitssuche-113-Skript Multimedia-Datenbanksysteme , Modelle der Datenexploration—Sommersemester 2004" with English-generated Translation, 2004, pp. 113-158, XP055239276, retrieved from the Internet: URL:http://www.dbs.ifi.Imu.de/Lehre/Multimedia/SS2004/Skript/Algorithmen.pdf [retrieved May 3, 2016].

European Summons to Attend Oral Proceedings—EP Appl. 12154178.3—dated Apr. 28, 2016.

European Decision to Refuse—EP Appl. 12154178.3—dated Feb. 9, 2017.

Nov. 27, 2017—Canadian Office Action—CA 2,767,024.
Oct. 2, 2018—Canadian Office Action—CA 2,767,024.
Sep. 17, 2019—Canadian Office Action—CA 2,767,024.
Oct. 1, 20204, Canadian Office Action, CA 2,767,024.
Sep. 27, 2021—Canadian Office Action—CA 2,767,024.

* cited by examiner

CONTENT ARCHIVE MODEL

CROSS-REFERENCE TO RELATED APPLICATIONS

The present application is a continuation of U.S. patent application Ser. No. 13/024,870 filed Feb. 10, 2011, entitled "Content Archive Model." This application is hereby incorporated by reference in its entirety.

BACKGROUND

Viewers have grown accustomed to using their digital video recorders (DVRs) to record shows to watch later. Early DVRs store recorded programs locally in hard drives, providing user playback options from the hard drive. These local hard-drive-based DVRs are well appreciated by users, but there is an ever-present demand for greater flexibility and functionality in how content is offered to, stored and managed for, users.

SUMMARY

The various features described herein relate to an archiving model for content, such as data or scheduled transmission of video programs. In some embodiments, a networked content server can maintain multiple storage devices for remotely storing content on behalf of various users. The devices can include at least one active storage device and at least one archive storage device. Each user may be given an allocation of storage capacity in these storage devices, and when a user requests to record an upcoming program, the content server can initially record the program in the active storage device, consuming a portion of the user's allocation in that active storage device.

If multiple users request to record the same program, the content server can store multiple, duplicate copies of the program in the active storage device. The duplicate copies can each respectively count against a respective user's allotment on the device, and can be accessed for playback from the active storage device.

At some time, the content server can determine that one or more pieces of content in the active storage device should be archived, and moved to an archive storage device. The decision to archive can be based on a variety of factors, such as available allocation space, user preference, age of content, and others. In the archiving, the various copies of the content may be copied and moved to the archive storage device. Deduplication can also be performed at this point to more efficiently store the duplicate copies.

When a user requests playback of a piece of content that has been archived, the server may first reconstitute the content from the archive storage device, to result in a copy stored in the active storage device that may resemble, or be identical to, the copy originally recorded for the user.

In some embodiments, the reconstitution of content can be predictively and dynamically handled. Predictive reconstitution capacity of the server can also be dynamically reallocated among user allocations, to help balance processing load and improve responsiveness to user needs for the reconstituted content.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
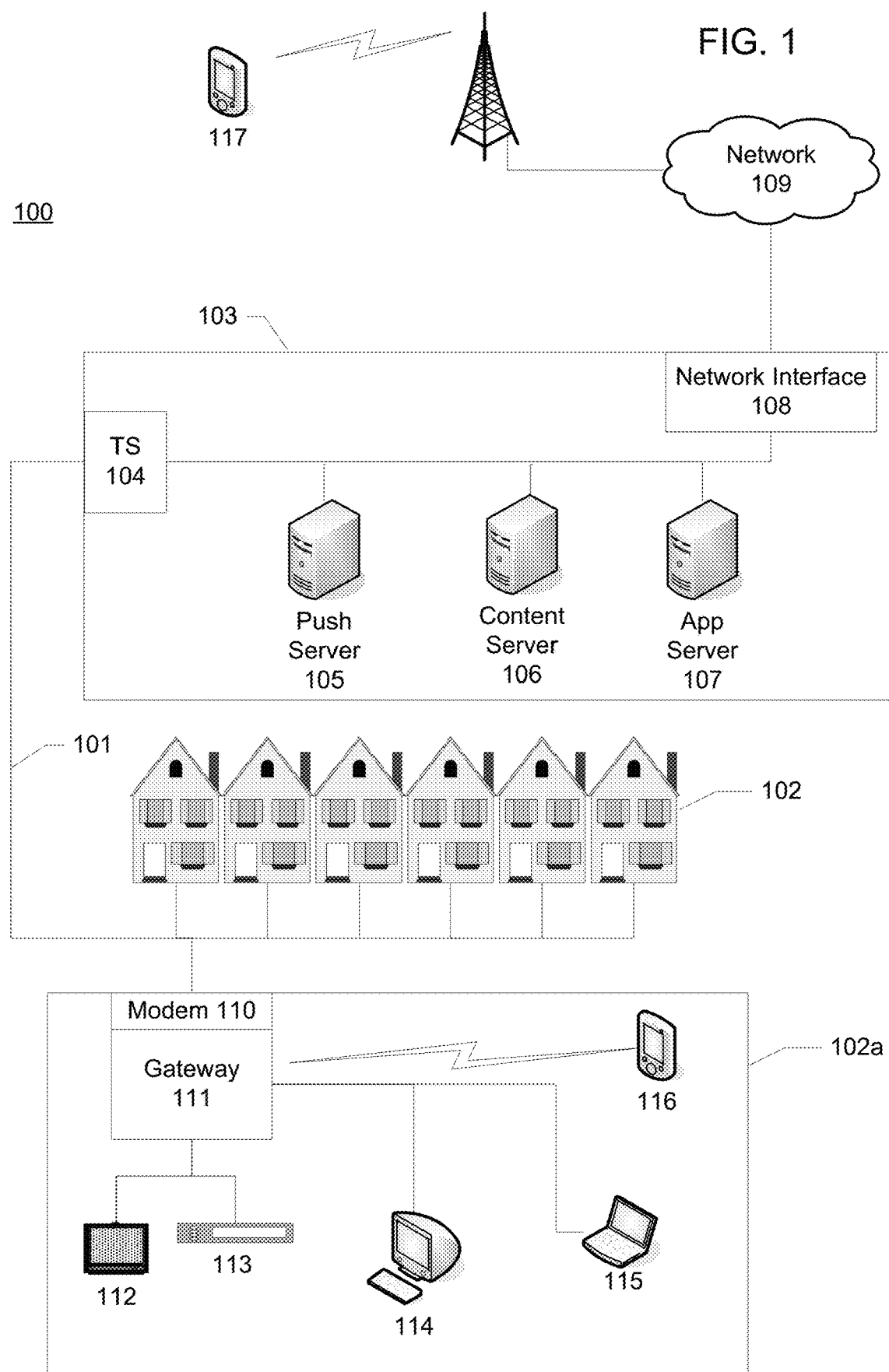
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple homes 102 to a central office or headend 103. The headend 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. Although the term home is used by way of example, locations 102 may be any type of user premises, such as businesses, institutions, etc. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a device 110, such as a modem, which may include transmitters and receivers used to communicate on the lines 101 and with the central office 103. The device 110 may be, for example, a coaxial cable modem (for coaxial cable lines 101), a fiber interface node (for fiber optic lines 101), or any other desired modem device. The device 110 may be connected to, or be a part of, a gateway interface device 111. The gateway interface device 111 may be a computing device that communicates with the device 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
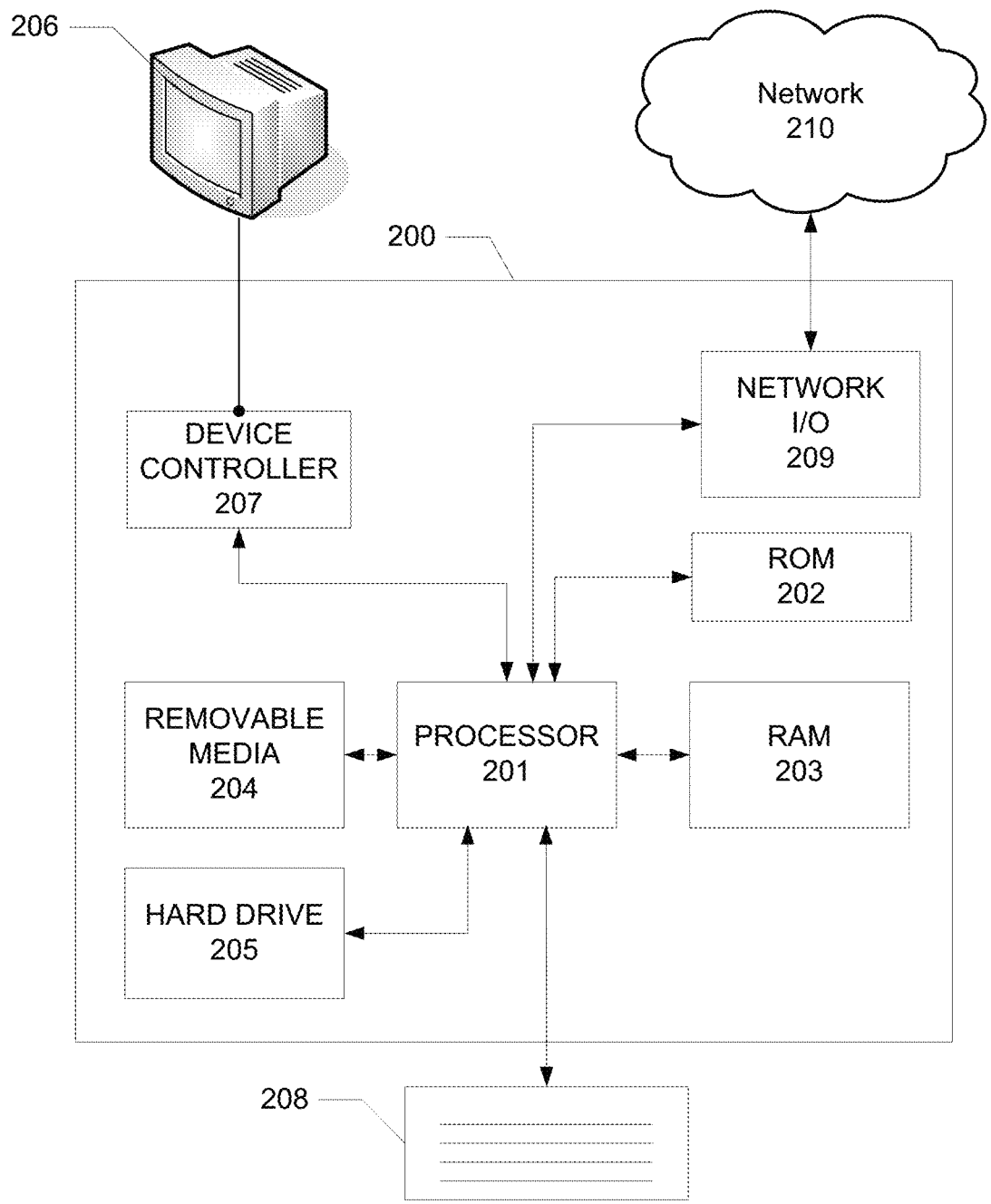
FIG. 2 illustrates an example hardware platform on which the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the central office 103 or another content storage facility or location. For example, one such user may be a viewer who is watching a television program being transmitted from the central office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

Figure 3:
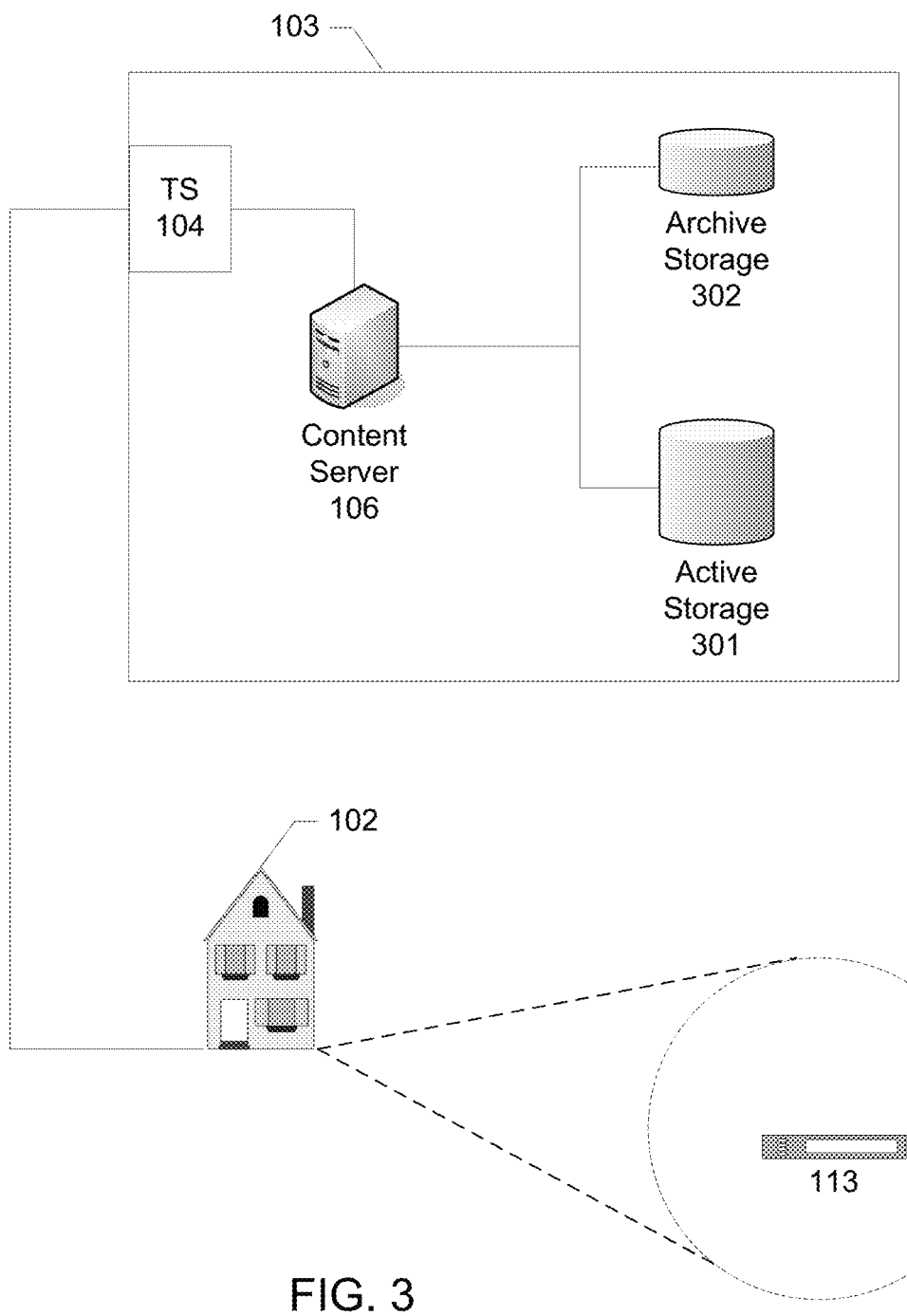
FIG. 3 illustrates an example hardware platform and distribution network on which features described herein may be implemented.

FIG. 3 illustrates a simplified version of a network such as the network 100 discussed above, to highlight some of the components used for an illustrative example embodiment in which network digital video recording (nDVR) options are provided to users. In the nDVR options, a user may select programs (e.g., linear broadcast or multicast programs, on demand programs, etc.) for recording, and the recorded content can be stored by the content server 106 instead of (or in addition to, if desired) at a device in the user's own home. The FIG. 3 example highlights some components similar to those illustrated in FIG. 1, such as the central office 103, termination server 104, home 102, content access device 113, etc., while two additional components are illustrated. The first additional component is the active storage 301. The active storage 301 may be a high capacity memory, such as a form of hard drive, FLASH, or any other type of suitable memory, that is configured for or capable of large-scale ingest of content. For example, the active storage 301 may include parallel recording and reading capabilities to support thousands of simultaneous reads and writes, which can be useful if, for example, thousands of households serviced by a central office 103 all desire to record shows being transmitted at a particular time, e.g., this evening. In use, the active storage 301 may be used by the content server 106 to store copies of the various programs or other content that users request to store in their network DVR allotments.

The second additional component is the archive storage 302. The archive storage 302 may be another memory component, similar to the active storage 301, although the archive storage 302 may be used for more long-term, archival storage of recorded content. So, as will be discussed in more detail below, in one example a user's recording of an episode of "Lost" may first result in a copy of that program being stored in the active storage 301, and after the user has viewed it, it can be stored in the archive storage 302 instead. The archive storage 302 may be larger than the active storage 301 in terms of overall storage capacity size, but it might omit the massive ingest capabilities of the active storage 301 (since the archive storage 302 need not be used to store the thousands of simultaneous program recordings as they are first made for requesting users, and can simply be used instead to store recordings after they have already been recorded; e.g., after they originally aired).

The components illustrated in the figures herein are merely examples, and can be altered, combined, subdivided, in any desired manner to still achieve results described herein.

Figure 4A:
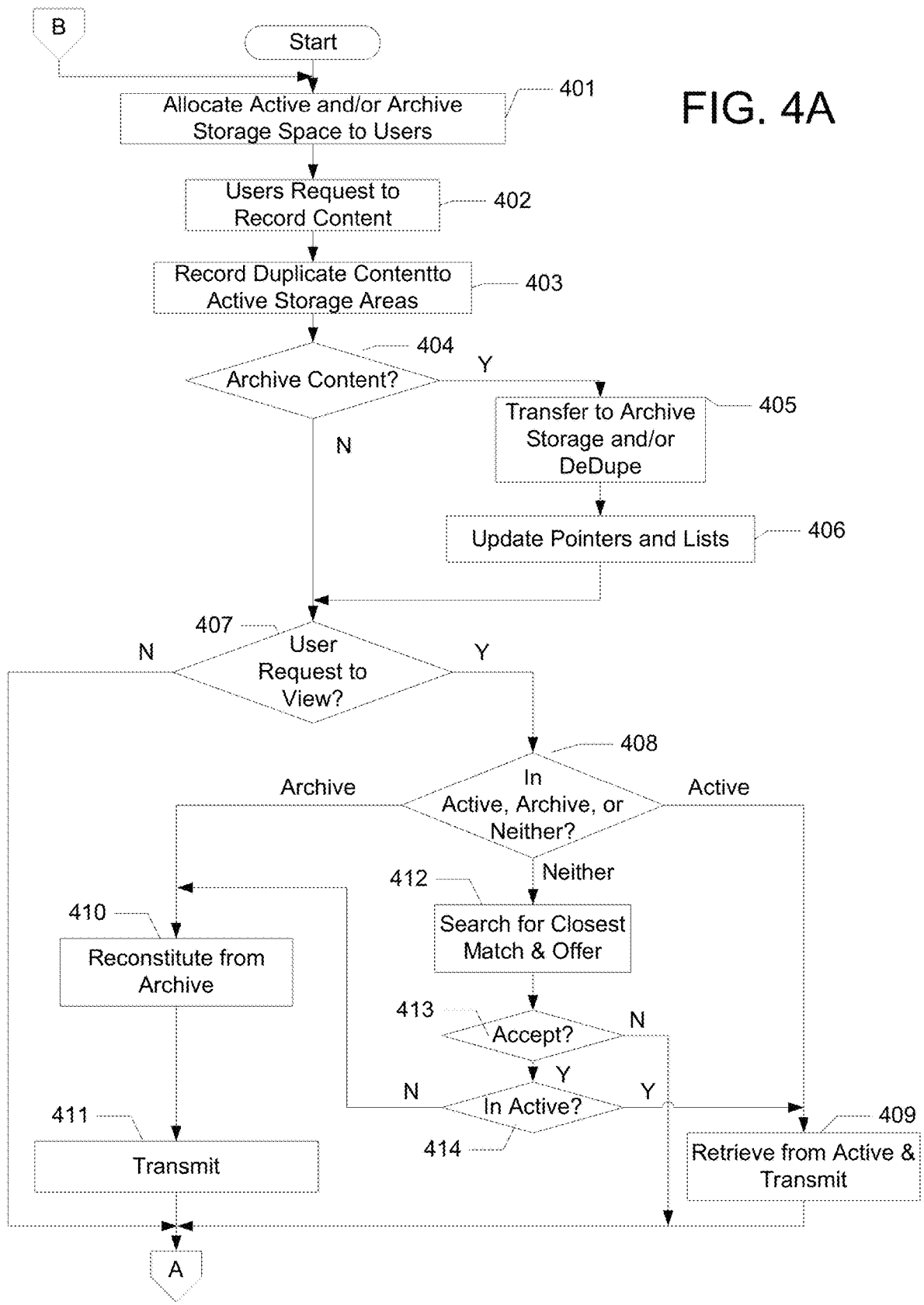
FIGS. 4A&B illustrate an example archive model method.

FIGS. 4A&B illustrate an example process for providing archived network recording storage to users. The steps may, but need not, all be performed by the same computing device, such as the content server 106 (which, in turn, can be implemented using the computing device 200 described above).

In step 401, the content server 106 may offer nDVR features to various users, such as the user of a set-top box 113 (or gateway, DVR, computer, smartphone, or any other desired computing device), and can allocate each user a predetermined amount of storage in one or both of the storages 301/302. For example, a user may be granted 16 Gb of storage in the active storage 301, and another 256 Gb of storage in the archive storage 302. The user may use this allocated space to store recordings of programs and downloaded content, as described in the below example. The allocation can be made on a per-user basis, or it can be made on a different basis, such as per-account (e.g., an account that can, for example, be accessed by multiple users), per-device (e.g., separate allocations can be made for different devices that can request storage, such as the STB 113, a smartphone, a game console, etc.), etc.

In step 402, one or more users may request to record a piece of content, such as a video or audio (which can include audiovisual) program, or other data, that is being transmitted currently or in the future according to a predetermined schedule, such as this week's episode of 'Boardwalk Empire.' In the alternative, users may wish to record data that is not transmitted according to a schedule but is accessible to the user, such as video on demand, Internet video sharing sites, other nonlinear content, etc. The request(s) may be received in any desired manner. For example, a user can access the STB 113, and open an onscreen electronic program guide (EPG). From there, the user may peruse a schedule of upcoming programs, and can select one for recording. If the STB 113 has local storage ability (e.g., as a DVR), the STB 113 may present the user with the option of having the selected program recorded locally or on the network (e.g., in the "cloud," on a remote external server, etc.).

In step 403, the various user-selected content may be copied for storage (tuning as needed) when it is transmitted and/or when it is available, by the content server 106, and provided to the active storage 301 for storage. Duplicate copies of the content, e.g., programs, may be stored in this initial recording process. For example, if one hundred viewers serviced by the content server 106 requested to record this week's episode of 'Boardwalk Empire,' the active storage 301 may store one hundred copies of that program. The data itself can be stored in any desired format, such as an MPEG-4 file, and the overall storage space consumed may be deducted from a total of each user's allotment. In some embodiments, the naming convention for each of the files may include information identifying the program and the specific user for whom that file has been recorded. For example, the name could follow the following format: [Program ID][User ID]. The Program ID may be any desired value that uniquely identifies the particular program, such as a title or alphanumeric code. In some embodiments, the program can be identified by virtue of the date/time of its transmission, format or compression used, and/or the service that carried it. In such embodiments, for example, a program's identifier may be "[HBO][Nov. 14, 2010, 9 pm]" for a program that aired on the HBO service at 9 pm on Nov. 14, 2010.

The User ID can be any desired data value that uniquely identifies the user whose nDVR allocation is used to store the recording. For example, the User ID can be the user's name, Social Security number, account number, etc. If the allocation is assigned to a device, such as the STB 113, then the User ID can uniquely identify the device itself, such as through a serial number or media access control (MAC) address. Similarly, allocations to accounts can identify the accounts using their own account numbers.

So from the above, the active storage 301 device may store a collection of files, and their filenames may be listed in a directory as follows:
[HBO][Nov. 14, 2010, 9 pm].[Jane Smit]
[HBO][Nov. 14, 2010, 9 pm].[Jane Smith]
[HBO][Nov. 14, 2010, 9 pm].[Jane Smyth]
[HBO][Nov. 14, 2010, 9 pm].[Account No. 33234235]
[HBO][Nov. 14, 2010, 9 pm].[Device No. 23adfacc235]

In some embodiments, the content server 106 may maintain a listing (e.g., a database file) of content that the user (or device, account, etc.) has recorded in the nDVR service, as well as a listing of the content stored in the active storage 301 and archive storage 302. The listing can contain the filenames above, as well as any additional information desired, such as the user's frequency of accessing the content, how long it was viewed, when it was viewed, when it was stored, etc.

In step 404, the content server 106 may check to determine whether it is time to archive content that is residing in the active storage 301. As noted above, a user's requested recording may initially be stored in the active storage 301. However, after certain conditions have been met, the content may be moved from the active storage 301 to the archive storage 302. Step 404 may involve evaluating those various conditions to determine which programs (if any) should be moved.

The conditions themselves may be any desired condition, and may be set by the content owner or provider server 106, the user, or any other desired device or actor. For example, the conditions may be based on age of storage. A maximum storage age may be defined for various recordings (e.g., two weeks, a month, etc.), and when a recording is maintained in the user's allotment on the active storage 301 for longer than the maximum age, then the server 106 may determine that the copy should be transferred to the archive storage 302.

In some embodiments, the maximum age may refer to the time since the program was initially recorded. In other embodiments, the maximum age may refer to the time since the program was last viewed by the user. Other types of maximum ages may be defined and used as well.

Another condition may be currency of the copy. If the recorded program is a periodic series, then a newer episode of the program may be stored in the active storage 301 each week, and older episodes may no longer be current. Such a currency condition may define a maximum number of episodes for a given series that will be maintained in the active storage 301. For example, the server 106 and/or user may define a currency condition of two, indicating that for any given series, only the most recent two episodes of the series will be retained in the active storage 301. Older episodes exceed this limit, and may be flagged for transfer to the archive storage 302.

Another condition may be allocation space availability. For example, the server 106 may define a condition to ensure that a predetermined amount of a user's allocation (e.g., 20%) will always be available for storage of new programs. If the user's recordings in the active storage 301 exceed that limit, then the server 106 may flag one or more of the user's recordings for transfer to the archive storage 302. It may choose the program(s) to move based on age (e.g., oldest moves first), file size (e.g., smallest moves first, standard definition (SD) moves before high-definition (HD) or vice-versa), user-defined priority, or any other desired characteristic.

Another condition can be based on the popularity of the recorded content. The server 106 may monitor the popularity of content by, for example, tracking the frequency with which users are requesting playback of their copy of the recorded content. Content ranking low in popularity may be prioritized for archiving. Similarly, the individual user's viewing pattern may be a factor as well. If a user has a history of recording content and not viewing them, then the server 106 may determine that that user's recordings may be prioritized for archiving, or archived sooner than it would have been for other users. Indeed, copies of the same content may be retained in those other users' respective active allocations, such that the same piece of content need not be deduplicated for all users at once, but rather can be deduplicated for subsets of users over time.

If, in step 404, the server 106 determines that one or more programs should be transferred to archive storage 302, then the process may proceed to step 405. In step 405, the content server 106 may instruct the storages 301/302 to move the program file(s) from the active storage 301 to the archive storage 302. The move can be a simple copy operation, and the copy on the active storage 301 may be deleted. In some embodiments, the transfer operation can include a deduplication operation. A deduplication operation can seek to reduce the amount of storage space needed to store duplicate copies of a particular program. So, for example, if ten copies of the same episode of a given program (e.g., this week's 'Boardwalk Empire' on HBO) exist in the active storage 301 for ten different users, then in step 405, the underlying MPEG-4 file might only be copied once to the archive storage 302 as a common file, and the various lists (described below) may simply contain pointers to the common file.

Deduplication can be done even for programs that are not exactly identical. For example, an episode of 'Hawaii Five-O' may be broadcast by the CBS network in multiple different regions of the country. Users in those different regions may each request to record the show to their nDVR allotments, but the video files for them will not be identical (e.g., commercials may be different, onscreen overlays of time/temperature/local station identification may be different, etc.). To deduplicate such similar programs, the content server 106 or associated device may determine that the programs were all mostly identical. This initial determination can be made, for example, by consulting the program identifiers (e.g., if the program identifier included a series identifier), or consulting previously-stored tables of related programs. The server 106 may also perform image processing on the video files, and conduct comparisons to identify programs whose imagery is similar. For example, the server 106 may perform a hash algorithm on a 4 KB block of a file, and compare it with hash values for 4 KB blocks of other files. It can also narrow the search initially by identifying programs having the same transmission time, service, similar words in title, etc. When the hash value comparison identifies two blocks that are the same, the corresponding portions can be compared in a more detailed manner (e.g., comparison of the original, non-hashed data), and if they are deemed to be the same then the system can store the portions that were the same (e.g., the 4 KB blocks that were the same) once for all of the copies, and can separately store the portions that were different (e.g., storing separately the commercials, or the bottom corners of the screen that had the different time/temp information).

Figure 5A:
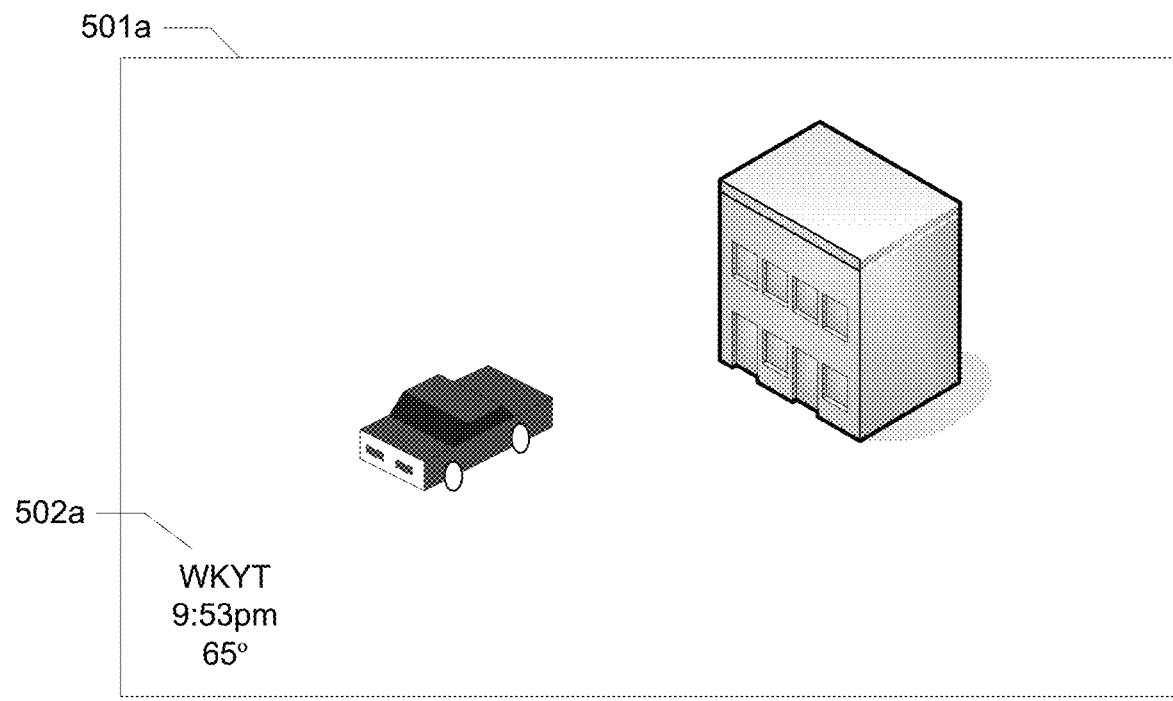
FIGS. 5A-C illustrate example images for a deduplication process.
Figure 5B:
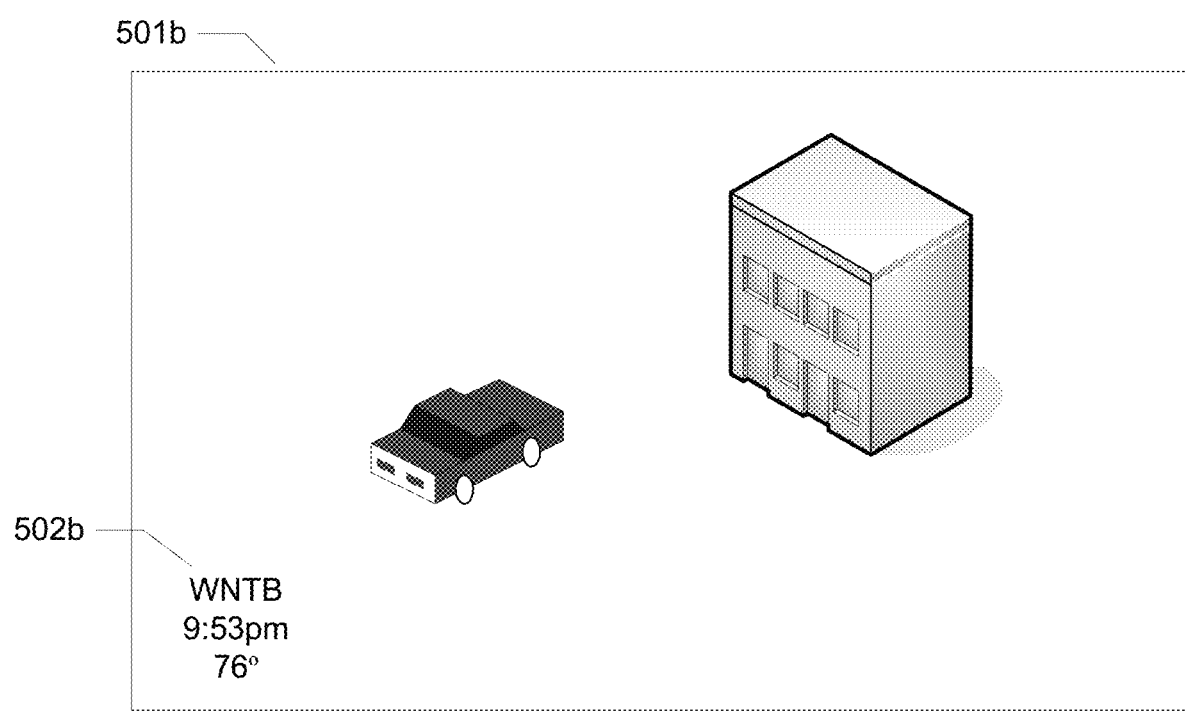
Figure 5C:
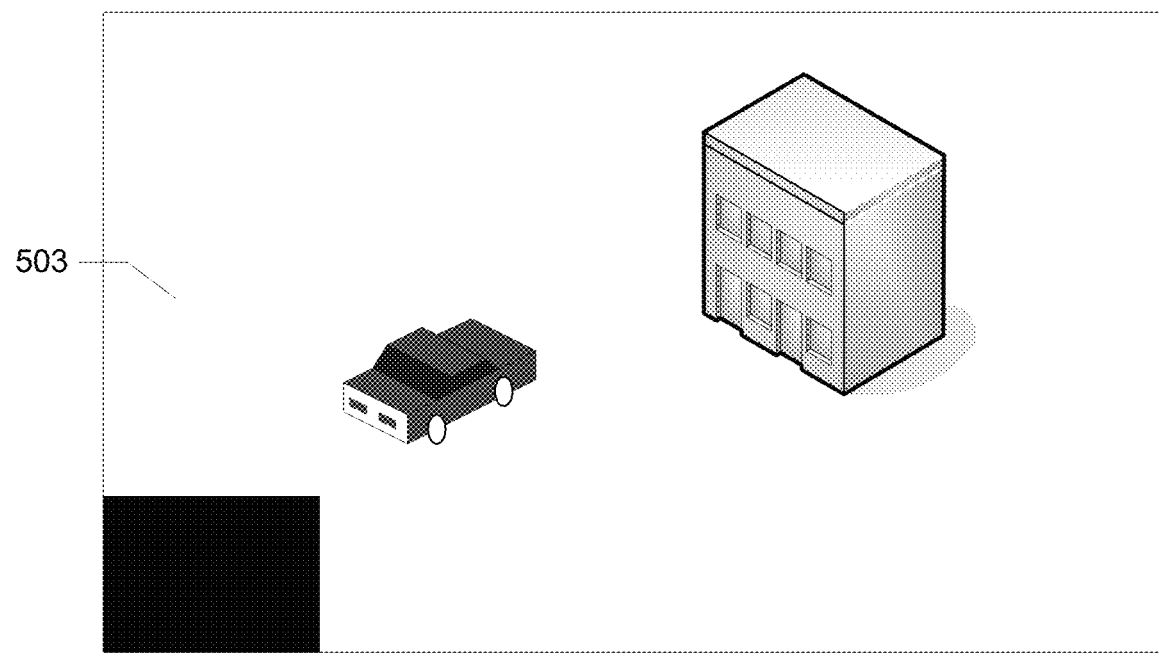

FIGS. 5A-C illustrate an example of such a deduplication. If an episode of 'Hawaii Five-O' is broadcast on a given date by multiple different CBS affiliates (e.g., one in Philadelphia, Pa. (FIG. 5A), and another in Camden, N.J. (FIG. 5B)), then the images seen by viewers of the different affiliates may resemble the scenes 501*a*,501*b*. In those scenes, most of the onscreen image is the same, except for the lower-left portion 502*a*,502*b* where the difference is the overlay of the local affiliate name/logo and the time/temperature information. If two users record this program, one user in Philadelphia and one in Camden, the deduplication may identify the common areas in these images, and may store files corresponding to the three parts shown in FIG. 5C. There, a single video file may contain video data for the common area 503 (the non-blacked-out portion of the image shown), and separate video files may be generated for the unique areas 504 and 505.

In step 406, the server 106 may store information indicating what has been stored in the archive storage 302, where they are stored, and how the programs were deduplicated. For example, if ten different users have the exact same video program recorded (e.g., the same episode of a national broadcast program, such as 'Boardwalk Empire' on HBO), then the server 106 may store one copy of the video file in archive storage 302, and each user's list may contain an entry for the program that identifies the program itself (e.g., title, program ID, etc.), the location for the common video file (e.g., file name, pointer, etc.), and an indication that it is shared via deduplication. If only portions of the program were common, such as the common portions 503 above, the list may identify the program as being split in that manner, with an entry identifying the file (or files) for the common areas (e.g., the file containing common area 503, its contours, etc.) an entry identifying the file (or files) for the unique areas (e.g., the file containing the video for area 504). The same or different user's list may contain an entry identifying how the common and unique areas should be reassembled to result in the original video that the particular user recorded (e.g., identifying the types of file formats used for the components, their respective positions of the components on the screen, playback timing, etc.).

The server 106 may also store a list for each unique program, identifying the different users that have the program in their active or archive storage allotments, how many users are sharing it, and how the program has been shared among them. For example, an entry for the shared program illustrated in FIGS. 5A-C may identify the show by its title, and may include information (e.g., file name, location, pointer, resource locator, etc.) identifying the video file containing the common portion 503, the unique portions 504, 505, and the users who have this program in their archive and/or active storage allocations.

The server 106 may also store listings identifying all of the programs that are stored in the active storage 301, and all of the programs that are stored in the archive storage 302. Such an overall listing may be helpful to users, providers and operators, for example, when searching through content (as will be discussed in the example further below), allocation of system resources, and network management.

In step 407, the server 106 can determine whether a user request to view or access recorded content has been received. Such a request can be made and received in a variety of ways. For example, a user can use a smartphone, STB 113, computer, or any other desired device to transmit a request (e.g., via an Internet page) to the server 106 to see a listing of available programs that have been stored for the user. The server 106 can respond by retrieving a listing corresponding to the user (or the device/account subject of the inquiry), and providing the user with a displayed listing of content from the user's allotment on the active storage 301 and/or archive storage 302. The request can also be entered through other means, such as by the user making a request from an EPG of previously-transmitted programs, upcoming programs (e.g., for reruns), entering a text/keyword title search to an Internet page interface, etc.

If such a request is received, then the server 106 can determine, in step 408 and for each such requesting user, whether the requested program or content is available in the user's active storage 301 allotment, archive storage 302 allotment, or neither. If the requested program is in the user's active storage 301, then the process can proceed to step 409, and the server 106 may retrieve the file(s) for the content from the active storage 301, and initiate a streaming download session to begin providing the requested program to the user. The initiated transmission (e.g., streaming) can begin from the start of the program, or from any desired start location of the program. For example, the user can be presented with an onscreen option to choose from different positions in the program (e.g., scenes, time positions, etc.) to begin the playback stream.

If the requested content is in the user's allotment in the archive storage 302, instead of the active storage 301, the process can proceed to step 410, and the server 106 may take measures to reconstitute a copy of the requested program from the archive storage 302. The reconstitution process can perform, for example, the reverse of whatever deduplication process (if any) was used in step 405 when initially transferring the content from the active storage 301 to the archive storage 302. For the example program shown in FIG. 5A-C, the server 106 may consult the user's listing, and identify the file(s) containing the audio/video data for the common area 503 and the unique area(s) 504 for the user's recorded program, and reconstitute a recording file in the user's active storage 301 allotment. The reconstituted file may contain complete images, having both areas 503/504, and may be in the same format as the original recording when the content was first stored into the active storage 301 for the user.

When the copy of the requested program has been reconstituted for the user in the active storage 301, the server 106 can then initiate a streaming session (or any type of transmission) in step 411 to begin streaming the requested program (e.g., from the active storage 301) to the user. This streaming can be the same as in step 409. In alternative embodiments, the reconstituted version of the content need not be stored in active storage 301, and may instead be stored elsewhere, or immediately transmitted to the user. Additionally, the reconstituted copy can also be coded or transcoded to a format supported by the requesting device. In some embodiments, if the user has chosen to begin the playback from some point other than the beginning of the program (e.g., starting the show 30 minutes after the show's beginning), the earlier portions of the program need not be reconstituted, such that the reconstituted copy can be a partial reconstitution of the program. The user's request may identify a time position from which playback should resume (e.g., the 30 minutes example above), and the server 106 can consult an index file for the program to identify a position from which playback and reconstitution should occur. The index file may identify, for example, file positions (e.g., bytes, frames, etc.) and their corresponding playing times (e.g., time since the beginning of the program, time/date of original transmission or airing, etc.). In some embodiments, the index file may also be used for trickplay functionality (e.g., fast forward, rewind, etc.).

If, in step 408, the requested program was not in the user's active storage allocation and not in the user's archive storage allocation, then the process may proceed to step 412, in which the server 106 can attempt to find an alternative content to offer to the user. In step 412, the server 106 can attempt a variety of ways to find a suitable alternative. For example, the system can use the title of the requested program (which may have been provided as part of the initial request) to conduct a search through the listings of content stored in the archive and/or active storages using the title of the requested program, its program ID, or any other value corresponding to the user's request. In doing so, the search may involve searching through content stored for use by other users (aside from the third user now requesting content). Another searching alternative may involve comparing portions of the actual video or audio data in candidate matches. For example, if ten candidate programs recorded for other users are initially identified as potentially being the show requested by the user based on program titles, the server 106 can conduct image analysis on the candidate program's contents to look for similarities. If the sampling of images appears similar (e.g., has a common hashed value, similar color combinations, or otherwise matches using a desired image matching algorithm), then the candidate content can be flagged for inclusion, and if the images do not look similar or match, candidate content can be discarded as possible matches. In some embodiments, the process of finding a suitable alternative may require less computational processing if other users had recorded the same program and had their copies archived through deduplication, such that the users all share a common archival copy of the program.

Continuing with the FIG. 5A-C example, if a user in a third city requested to view the same episode, but did not previously select it for recording, then the episode might not be found in either the user's active storage allocation or archive storage allocation. However, the server 106 may find the two other versions that were stored.

In step 413, the search results may be provided to the user with an option to accept one. So, continuing with the FIG. 5A-C example, the user in the third city might not have a recording of his/her local CBS affiliate's broadcast of the show, but the server 106 may offer a listing of the other two affiliates' versions, which are stored on the storages 301/302. The offered listing may list the episodes by their title, air date, description, network affiliate/city of broadcast, etc., and may allow the third city's user to select one for viewing. The listing may be offered, for example, using a similar interface discussed relative to steps 402 or 407 to select programs (e.g., an EPG, Internet listing, etc.), and the user's selection may be handled as a selection in a similar manner.

If the user chooses one as acceptable, then the system may proceed to step 414, and determine whether the requested version is stored in active or archive storage. If in active, the system may proceed to step 409 to retrieve the video file(s) from active storage 301 and initiate a streaming session to deliver the requested program to the user. The server 106 may also create another copy of the program in the active storage 301, and store it in the third user's own allotment in that active storage 301.

If the program is in the archive storage 302, the server 106 may proceed to step 410 to reconstitute the program, for example, into the third user's own active storage 301 allotment, and initiate the transmission in step 411 to provide it to the third user.

Figure 4B:
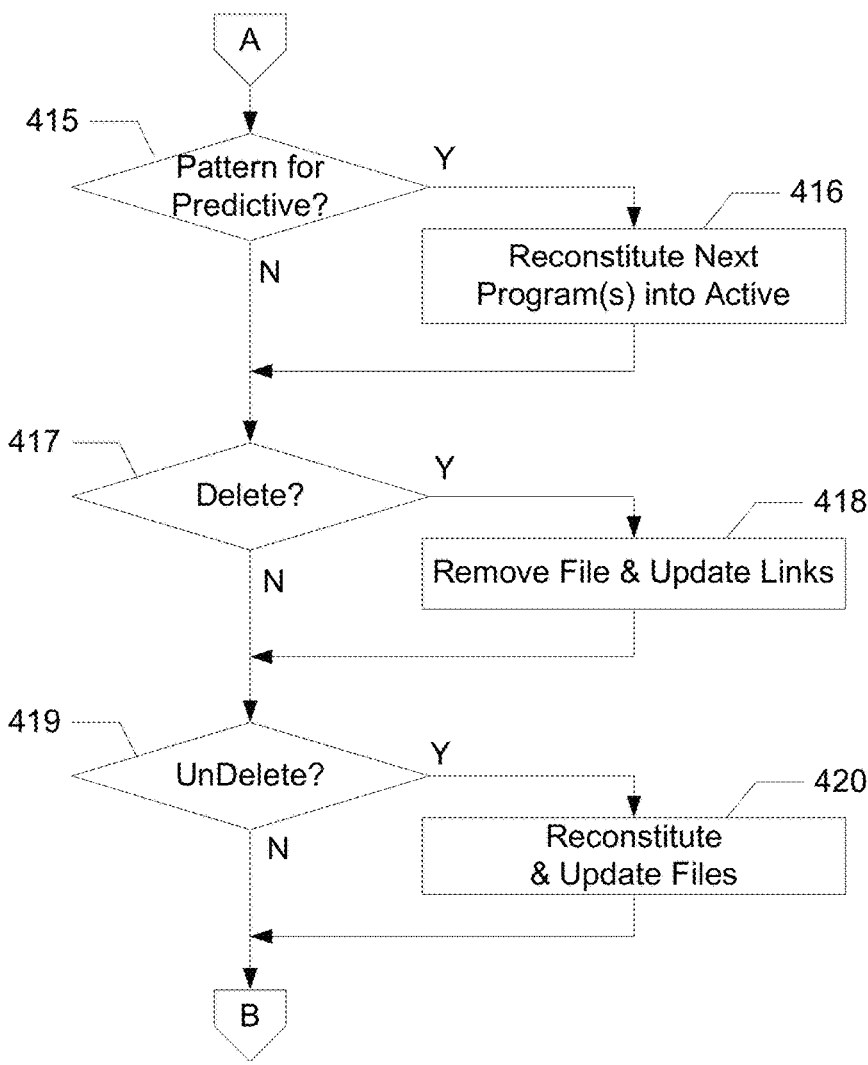

After the streaming sessions from steps 409 and/or 411 have been initiated for the various requesting users, or if a requesting user refuses the offerings in step 413, or if no user requests for viewing content are received in step 407, the process may proceed to step 415 (FIG. 4B). In step 415, the server 106 may determine whether any of its users have entered into a pattern of activity in which predictive reconstitution would be desired. Predictive reconstitution may occur whenever the server 106 reconstitutes a program from the archive storage 302 into a user's allotment on the active storage 301 in anticipation of the user requesting to view the content, and without necessarily receiving an actual request yet from the user to view that content.

A variety of factors can lead to such predictive reconstitution. One factor may be based on what the user is currently viewing. For example, if the user is currently viewing a program that has a relationship to one or more programs that are stored in the user's archive storage allotment, the server 106 can determine that the user is likely to request to view that content, and can reconstitute that content in advance of the user actually requesting to view it. One type of relationship can exist in periodic or sequential episodes of a video program. If the user is currently watching, either through a live linear scheduled transmission or through an on demand stream (e.g., from selecting it in step 407), an earlier episode of a series, the server 106 can anticipate that the user is likely to request to view the next recorded episode of the series, and can reconstruct that next episode in advance. To avoid unnecessary predictive reconstitution, the server 106 may wait until the user has watched a minimum amount of the prior episode (e.g., at least half of it), or is nearing the prior episode's conclusion (e.g., streaming position in the program is within ten minutes of its conclusion), before initiating a predictive reconstitution.

Another factor may be based on the user's personal viewing schedule. If the content server 106 has recorded the user's prior viewing habits, the server 106 may identify a pattern to the viewing. For example, the user may tend to catch up on the week's worth of a nightly talk show on Saturday mornings. The server 106 may identify this pattern, and can determine early Saturday morning that the user is likely to want to view those talk show recordings. The user can also set this pattern in an options menu, informing the server 106 that he/she plans to catch up on Saturday mornings.

Another factor can be the server 106's own processing capacity. The server 106 may have limited processing capacity to handle the various tasks described herein, and even if those tasks are divided among a plurality of servers working in concert (an option described herein), that plurality will also not have infinite resources. To help conserve resources, the server 106 may seek to perform more predictive reconstitutions when the server 106 processing usage is otherwise low. For example, during prime time viewing hours on weeknights (e.g., 8-10 pm), a large percentage of the users serviced by a particular server 106 may be viewing and/or recording content. In the late hours (e.g., 4-5 am), fewer users are likely to be using the server 106. In those late hours, the server 106 may seek to perform more predictive reconstitution than would be performed during the prime time hours, by lowering requirements for meeting the condition in step 415. For example, during normal prime-time hours, the server 106 may be configured to predictively reconstitute the next episode of 'Hawaii Five-O' if the user starts watching an earlier episode. In the late hours, however, the server 106 may be configured to predictively reconstitute two, three, or all of the next episodes that are stored in the user's archive. The server 106 can dynamically monitor its own usage levels to determine whether it is high or low, or alternatively it can simply follow a predetermined schedule based on time of day, under the assumption that certain times of day (e.g., 4-5 am) are low use times of day.

In some embodiments, the reconstitution capacity of the server 106 can be dynamically reallocated and prioritized according to need. So, for example, a user who is five minutes away from the end of an earlier episode in a series may be given a higher priority than a user who has just begun watching an episode in another series, since the first user is more likely to need his/her next episode sooner.

If a predictive reconstitution is desired in step 415, the server 106 may proceed to step 416, and reconstitute one or more programs from the user's archive storage 302 to the user's active storage 301. The reconstitution may follow the same process discussed above in step 410.

In step 417, the server 106 may determine if a user has entered a request to delete a piece of recorded content from the user's allotment in the active storage 301, archive storage 302, or both. If the user has requested to delete a piece of content, the server can proceed to step 418 to process the deletion. As part of the deletion, the stored file(s) for the program may be deleted from the user's allotment in the active storage 301. If the user requested to delete an archived copy from the archive storage 302, the server 106 may update the listing of content to indicate that it has been deleted, but the listing can retain the entry, and the underlying common files (e.g., for common areas 503) may be retained in the archive storage 302, since they may still be needed by the user or other users (e.g., in the future). The files for unique portions 504 may be deleted from the archive storage 302 if there are no other users relying on it (e.g., if it was not common with another user).

With this deletion, the user may still be able to view the program again (e.g., in step 412's search) if the common portions of the program are still in the archive storage 302 to support other users. The user can also have an "undelete" option if he/she changes their mind about the deleted program. The user can request to see a listing of the programs that have been marked as deleted in the server 106's list for the particular user, and can select one for undeletion in step 419.

In response, the server 106 may reconstitute the file and update its files in step 420, performing similar steps as discussed above in steps 412-414 and 410-411 to reconstitute the deleted program into the user's active storage allotment.

Following step 419 or 420, the process may return to step 401 and repeat indefinitely.

The example method shown in FIGS. 4A&B is just an example, and the various steps discussed may be combined, divided, and rearranged as desired. Modifications may be made as well. For example, the various steps may be discussed above as being performed by a content server 106, but the implementation may use multiple servers 106 or sub-components to achieve the same results, or the processing can be performed by a different server in the system.

The discussion above refers to storing files into a user's allotment on the active storage 301 or archive storage 302. This allocation may, but need not, refer to specific memory locations in whatever memory device is used for those storages. For example, in some embodiments, predefined address ranges in the memory itself may be reserved for storing video files recorded for the user. In other embodiments, the actual physical addresses of the storage may be managed using any desired memory management approach, and the user's allocation may simply be a running total of the amount of storage space being used for the user's recorded programs.

In the example above of step 411, the requested program can be streamed in its entirety from the starting position, or it can start from some other location, such as a point at which the user previously stopped watching the program, or a user-selected point in the show. In some embodiments, the streaming can begin before the entire program is reconstituted. For example, the streaming may begin once the server 106 has reconstituted an initial playback portion (e.g., the first ten minutes starting from the desired starting point), and the reconstitution in step 410 can dynamically continue while the streaming is occurring. While the stream may have begun with only ten reconstituted minutes of the program in the active storage area, the reconstitution may continue apace during the transmission, to add to the active storage area's copy, keeping ahead of the playback pace. In response to the user changing the presentation rate (e.g., fast forward, rewind), the server 106 can alter the reconstitution to reconstitute different portions as they are needed. So, for example, switching to rewind may result in the server 106 reconstituting the program extending backwards from the starting point.

In some further examples, this dynamic reconstitution can begin with the ten-minute initial playback portion, and can continue in both directions of the program while the streaming is occurring. For example, the server 106 can reconstitute the initial ten-minute portion, begin the stream in step 411, and then continue to reconstitute the program by reconstituting the ten previous minutes and the ten minutes after the initial streaming portion. Ten minutes is used as an example, but any desired portioning can be used.

The discussion above refers to the server 106 maintaining various lists of content to help keep track of content that is stored. In some embodiments, file naming conventions can also be used to help in the management. For example, the content file for a recorded program may be named using a predetermined convention, so that the file name includes a field for the name of the program (e.g., its title, its program ID, etc.) and the name or other identifier of the user for whom it has been recorded. For example, the name "BoardwalkEmpire.Tom" can be used to name a file for Tom's recording of the show 'Boardwalk Empire.' Such a naming convention can assist in the search for a similar program in step 412. If the user had deleted his/her copy of the program, the server 106 could run a filename search using the same title and a wildcard character for the user (e.g., a search for "BoardwalkEmpire.*").

The various features described above are merely nonlimiting examples, and can be rearranged, combined, subdivided, omitted, and/or altered in any desired manner. For example, features of the server 106 can be subdivided among multiple processors and computing devices. The true scope of this patent should only be defined by the claims that follow.

We claim:

1. A method comprising:
   receiving multiple versions of a content item corresponding to different users;
   storing, in an archive storage, a common portion of each of the multiple versions of the content item;
   storing, in different portions of the archive storage that are allocated to the different users, unique portions of the multiple versions of the content item;
   determining that a unique portion of a version of the content item corresponding to a first user is unavailable;
   reconstituting, based on determining that the unique portion of the version of the content item corresponding to the first user is unavailable, an alternative version of the content item by:
      retrieving the common portion from the archive storage; and
      retrieving, from a portion of the archive storage that is allocated to a second user, a unique portion of a version of the content item corresponding to the second user, wherein the unique portion of the version of the content item corresponding to the second user is different from the unique portion of the version of the content item corresponding to the first user; and
   providing the reconstituted alternative version of the content item to the first user.

2. The method of claim 1, further comprising:
   determining the common portion and the unique portions based on comparing a hash value of a portion of a first version of the content item with hash values of different portions of a second version of the content item.

3. The method of claim 1, further comprising:
   determining a unique portion of a version of the content item corresponding to a third user, wherein the unique portion of the version of the content item corresponding to the third user is different from the unique portion of the version of the content item corresponding to the second user; and
   providing the first user with an option to select, for reconstituting the alternative version of the content item, between the unique portion of the version of the content item corresponding to the second user and the unique portion of the version of the content item corresponding to the third user.

4. The method of claim 1, further comprising:
   beginning providing the reconstituted alternative version of the content item prior to completing reconstituting the alternative version of the content item.

5. The method of claim 1, wherein the reconstituting the alternative version of the content item comprises:
   determining that the content item sequentially follows content currently being viewed by the first user; and
   selecting the content item for reconstitution prior to completion of providing the content currently being viewed by the first user.

6. The method of claim 1, further comprising:
   beginning reconstitution of the alternative version of the content item based on determining that the first user has viewed a minimum portion of content currently being viewed by the first user.

7. The method of claim 1, further comprising reconstituting the alternative version of the content item based on a request from the first user to view the version of the content item corresponding to the first user.

8. The method of claim 1, further comprising:
   dynamically reallocating reconstitution capacity between different user allocations based on user consumption levels of content.

9. The method of claim 1, further comprising:
   receiving, from the first user, a request to delete the version of the content item corresponding to the first user;
   deleting the version of the content item corresponding to the first user based on the request to delete the version of the content item corresponding to the first user;
   receiving, from the first user, a request to undelete the version of the content item corresponding to the first user; and
   storing, in a portion of an active storage allocated to the first user and based on the request to undelete the version of the content item corresponding to the first user, the reconstituted alternative version of the content item.

10. An apparatus comprising:
    one or more processors; and
    memory storing instructions that, when executed by the one or more processors, cause the apparatus to:
    receive multiple versions of a content item corresponding to different users;
    store, in an archive storage, a common portion of each of the multiple versions of the content item;
    store, in different portions of the archive storage that are allocated to the different users, unique portions of the multiple versions of the content item;
    determine that a unique portion of a version of the content item corresponding to a first user is unavailable;
    reconstitute, based on determining that the unique portion of the version of the content item corresponding to a first user is unavailable, an alternative version of the content item by
       retrieving the common portion from the archive storage; and
       retrieving, from a portion of the archive storage that is allocated to a second user, a unique portion of a version of the content item corresponding to the second user, wherein the unique portion of the version of the content item corresponding to the second user is different from the unique portion of the version of the content item corresponding to the first user; and
    provide the reconstituted alternative version of the content item to the first user.

11. The apparatus of claim 10, wherein the instructions, when executed by the one or more processors, cause the apparatus to:
    determine the common portion and the unique portions based on comparing a hash value of a portion of a first version of the content item with hash values of different portions of a second version of the content item.

12. The apparatus of claim 10, wherein the instructions, when executed by the one or more processors, cause the apparatus to:
    determine a unique portion of a version of the content item corresponding to a third user, wherein the unique portion of the version of the content item corresponding to the third user is different from the unique portion of the version of the content item corresponding to the second user; and
    provide the first user with an option to select, for reconstituting the alternative version of the content item, between the unique portion of the version of the content item corresponding to the second user and the unique portion of the version of the content item corresponding to the third user.

13. The apparatus of claim 10, wherein the instructions, when executed by the one or more processors, cause the apparatus to:
    begin providing the reconstituted alternative version of the content item prior to completing reconstitution of the alternative version of the content item.

14. The apparatus of claim 10, wherein the instructions, when executed by the one or more processors, cause the apparatus to:
    determine that the content item comprises a next sequential program to a content currently being viewed by the first user; and
    select the content item for reconstitution prior to completion of providing the content currently being viewed by the first user.

15. The apparatus of claim 10, wherein the instructions, when executed by the one or more processors, cause the apparatus to:
    begin reconstitution of the alternative version of the content item based on determining that the first user has viewed a minimum portion of content currently being viewed by the first user.

16. The apparatus of claim 10, wherein the instructions, when executed by the one or more processors, cause the apparatus to:
    dynamically reallocate reconstitution capacity between different user allocations based on user consumption levels of content.

17. The apparatus of claim 10, wherein the instructions, when executed by the one or more processors, cause the apparatus to:
    receive, from the first user, a request to delete the version of the content item corresponding to the first user;
    delete the version of the content item corresponding to the first user based on the request to delete the version of the content item corresponding to the first user;
    receive, from the first user, a request to undelete the deleted version of the content item corresponding to the first user; and
    store, in a portion of an active storage allocated to the first user and based on the request to undelete the deleted version of the content item corresponding to the first user, the reconstituted alternative version of the content item.

18. A non-transitory computer-readable medium storing instructions that, when executed, cause:
- receiving multiple versions of a content item corresponding to different users;
- storing, in an archive storage, a common portion of each of the multiple versions of the content item;
- storing, in different portions of the archive storage that are allocated to the different users, unique portions of the multiple versions of the content item;
- determining that a unique portion of a version of the content item corresponding to a first user is unavailable;
- reconstituting, based on determining that the unique portion of the version of the content item corresponding to the first user is unavailable, an alternative version of the content item by:
  - retrieving the common portion from the archive storage; and
  - retrieving, from a portion of the archive storage that is allocated to a second user, a unique portion of a version of the content item corresponding to the second user, wherein the unique portion of the version of the content item corresponding to the second user is different from the unique portion of the version of the content item corresponding to the first user; and
- providing the reconstituted alternative version of the content item to the first user.

19. The non-transitory computer-readable medium of claim 18, wherein the instructions, when executed, further cause:
- determining the common portion and the unique portions based on comparing a hash value of a portion of a first version of the content item with hash values of different portions of a second version of the content item.

20. The non-transitory computer-readable medium of claim 18, wherein the instructions, when executed, further cause:
- determining a unique portion of a version of the content item corresponding to a third user, wherein the unique portion of the version of the content item corresponding to the third user is different from the unique portion of the version of the content item corresponding to the second user; and
- providing the first user with an option to select, for reconstituting the alternative version of the content item, between the unique portion of the version of the content item corresponding to the second user and the unique portion of the version of the content item corresponding to the third user.

21. The non-transitory computer-readable medium of claim 18, wherein the instructions, when executed, further cause:
- beginning providing the reconstituted alternative version of the content item prior to completing reconstituting the alternative version of the content item.

22. The non-transitory computer-readable medium of claim 18, wherein the instructions, when executed, further cause:
- determining that the content item comprises a next sequential program to a content currently being viewed by the first user; and
- selecting the content item for reconstitution prior to completion of providing the content currently being viewed by the first user.

23. The non-transitory computer-readable medium of claim 18, wherein the instructions, when executed, further cause:
- beginning reconstitution of the alternative version of the content item based on determining that the first user has viewed a minimum portion of content currently being viewed by the first user.

24. The non-transitory computer-readable medium of claim 18, wherein the instructions, when executed, further cause:
- dynamically reallocating reconstitution capacity between different user allocations based on user consumption levels of content.

25. The non-transitory computer-readable medium of claim 18, wherein the instructions, when executed, further cause:
- receiving, from the first user, a request to delete the version of the content item corresponding to the first user;
- deleting the version of the content item corresponding to the first user based on the request to delete the version of the content item corresponding to the first user;
- receiving, from the first user, a request to undelete the version of the content item corresponding to the first user; and
- storing, in a portion of an active storage allocated to the first user and based on the request to undelete the version of the content item corresponding to the first user, the reconstituted alternative version of the content item.

26. A system comprising:
a first computing device; and
a second computing device,
wherein the first computing device comprises:
- one or more first processors; and
- first memory storing first instructions that, when executed by the one or more first processors, cause the first computing device to:
  - receive multiple versions of a content item corresponding to different users;
  - store, in an archive storage, a common portion of each of the multiple versions of the content item;
  - store, in different portions of the archive storage that are allocated to the different users, unique portions of the multiple versions of the content item;
  - determine that a unique portion of a version of the content item corresponding to a first user is unavailable;
  - reconstitute, based on determining that the unique portion of the version of the content item corresponding to the first user is unavailable, an alternative version of the content item by
    - retrieving the common portion from the archive storage; and
    - retrieving, from a portion of the archive storage that is allocated to a second user, a unique portion of a version of the content item corresponding to the second user, wherein the unique portion of the version of the content item corresponding to the second user is different from the unique portion of the version of the content item corresponding to the first user; and
  - provide the reconstituted alternative version of the content item to the first user,
wherein the second computing device comprises:
- one or more second processors; and second memory storing second instructions that, when executed by the one or more second processors, cause the second computing device to:
receive the reconstituted alternative version of the content item.

27. The system of claim 26, wherein the first instructions, when executed by the one or more first processors, cause the first computing device to:
determine the common portion and the unique portions based on comparing a hash value of a portion of a first version of the content item with hash values of different portions of a second version of the content item.

28. The system of claim 26, wherein the first instructions, when executed by the one or more first processors, cause the first computing device to:
determine a unique portion of a version of the content item corresponding to a third user, wherein the unique portion of the version of the content item corresponding to the third user is different from the unique portion of the version of the content item corresponding to the second user; and
provide the first user with an option to select, for reconstituting the alternative version of the content item, between the unique portion of the version of the content item corresponding to the second user and the unique portion of the version of the content item corresponding to the third user.

29. The system of claim 28, wherein the first instructions, when executed by the one or more first processors, cause the first computing device to:
begin providing the reconstituted alternative version of the content item prior to completing reconstitution of the alternative version of the content item.

30. The system of claim 26, wherein the first instructions, when executed by the one or more first processors, cause the first computing device to:
determine that the content item comprises a next sequential program to a content currently being viewed by the first user; and
select the content item for reconstitution prior to completion of providing the content currently being viewed by the first user.

31. The system of claim 26, wherein the first instructions, when executed by the one or more first processors, cause the first computing device to:
begin reconstitution of the alternative version of the content item based on determining that the first user has viewed a minimum portion of content currently being viewed by the first user.

32. The system of claim 26, wherein the first instructions, when executed by the one or more first processors, cause the first computing device to:
dynamically reallocate reconstitution capacity between different user allocations based on user consumption levels of content.

33. The system of claim 26, wherein the first instructions, when executed by the one or more first processors, cause the first computing device to:
receive, from the first user, a request to delete the version of the content item corresponding to the first user;
delete the version of the content item corresponding to the first user based on the request to delete the version of the content item corresponding to the first user;
receive, from the first user, a request to undelete the version of the content item corresponding to the first user; and
store, in a portion of an active storage allocated to the first user and based on the request to undelete the version of the content item corresponding to the first user, the reconstituted alternative version of the content item.

34. The method of claim 1, further comprising providing, the the first user, a request to accept the reconstituted alternative version of the content item.

35. The apparatus of claim 10, wherein the instructions, when executed by the one or more processors, cause the apparatus to:
provide, to the first user, a request to accept the reconstituted alternative version of the content item.

36. The non-transitory computer-readable medium of claim 18, wherein the instructions, when executed, further cause:
providing, to the first user, a request to accept the reconstituted alternative version of the content item.

37. The system of claim 26, wherein the first instructions, when executed by the one or more first processors, further cause the first computing device to:
provide, to the first user, a request to accept the reconstituted alternative version of the content item.

38. The apparatus of claim 10, wherein the instructions, when executed by the one or more processors, further cause the apparatus to:
reconstitute the alternative version of the content item based on a request from the first user to view the version of the content item corresponding to the first user.

39. The non-transitory computer-readable medium of claim 18, wherein the instructions, when executed, further cause:
reconstituting the alternative version of the content item based on a request from the first user to view the version of the content item corresponding to the first user.

40. The system of claim 26, wherein the first instructions, when executed by the one or more first processors, further cause the first computing device to:
reconstitute the alternative version of the content item based on a request from the first user to view the version of the content item corresponding to the first user.

* * * * *

UNITED STATES PATENT AND TRADEMARK OFFICE
CERTIFICATE OF CORRECTION

PATENT NO. : 11,218,762 B2
APPLICATION NO. : 14/631106
DATED : January 4, 2022
INVENTOR(S) : Walker et al.

It is certified that error appears in the above-identified patent and that said Letters Patent is hereby corrected as shown below:

On the Title Page

Page 2, Column 2, Other Publications, Line 30:
Delete "Oct. 1, 20204," and insert --Oct. 14, 2020,-- therefor In the Drawings Sheet 4 of 7, Fig. 4A, Reference Numeral 403, Line 1:
Delete "Contentto" and insert --Content to-- therefor In the Specification Column 8, Detailed Description, Line 36:
After "502a,502b", insert --,--

In the Claims

Column 15, Line 55:
In Claim 10, after "by", insert --:--

Column 18, Line 53:
In Claim 26, after "by", insert --:--

Column 19, Line 28:
In Claim 29, delete "claim 28," and insert --claim 26,-- therefor Column 20, Line 17:
In Claim 34, delete "the the" and insert --to the-- therefor Signed and Sealed this
Twenty-fourth Day of October, 2023

Katherine Kelly Vidal
*Director of the United States Patent and Trademark Office*